(12) United States Patent
Stone et al.

(10) Patent No.: US 7,352,811 B2
(45) Date of Patent: Apr. 1, 2008

(54) DATA ENCODING APPARATUS AND METHOD

(75) Inventors: Jonathan James Stone, Reading (GB); Jason Charles Pelly, Reading (GB); Nicholas Ian Saunders, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 736 days.

(21) Appl. No.: 10/097,210

(22) Filed: Mar. 12, 2002

(65) Prior Publication Data

US 2002/0136296 A1 Sep. 26, 2002

Related U.S. Application Data

(63) Continuation of application No. PCT/GB01/03032, filed on Jul. 6, 2001.

(30) Foreign Application Priority Data

Jul. 14, 2000 (GB) ................................ 0017379.9

(51) Int. Cl.
*H04B 1/66* (2006.01)

(52) U.S. Cl. ........................... 375/240.03; 375/240.04; 375/240.06; 375/240.23; 375/240.24; 375/240.2; 382/251; 382/250; 382/246; 382/249; 382/244

(58) Field of Classification Search .......... 375/240.03, 375/240.04, 240.06, 240.23, 240.24, 240.2; 382/251, 250, 246, 249, 244
See application file for complete search history.

(56) References Cited

U.S. PATENT DOCUMENTS

| | | | | | |
|---|---|---|---|---|---|
| 5,530,478 | A | * | 6/1996 | Sasaki et al. | 375/240.04 |
| 5,675,385 | A | * | 10/1997 | Sugiyama | 375/240.2 |
| 5,982,433 | A | * | 11/1999 | Kim | 375/240.01 |
| 6,111,991 | A | * | 8/2000 | Ribas-Corbera et al. | 382/251 |
| 6,118,817 | A | * | 9/2000 | Wang | 375/240.03 |

FOREIGN PATENT DOCUMENTS

| | | |
|---|---|---|
| EP | 0 361 384 | 4/1990 |
| EP | 0 405 572 | 1/1991 |
| EP | 0 750 426 | 12/1996 |
| EP | 0 797 356 | 9/1997 |
| EP | 0 888 010 | 12/1998 |
| GB | 2 306 840 | 5/1997 |
| WO | WO 96 02895 | 2/1996 |

* cited by examiner

*Primary Examiner*—Shawn S. An
(74) *Attorney, Agent, or Firm*—Oblon, Spivak, McClelland, Maier & Neustadt, P.C.

(57) ABSTRACT

A data encoding apparatus operable to encode a plurality of data blocks produces encoded data in accordance with at least one of a selectable target data quantity or a selectable target data quality. The apparatus comprises a plurality of encoding processors at least one of the encoding processors having a parameter controller operable to determine, for each of the data blocks, a value for an encoding parameter to be used in an encoding process, which encoding parameter has an effect of influencing the quantity of encoded data produced by the encoding process and the quality of a decoded version of each data block encoded using the encoding process, the value of the parameter being determined to satisfy at least one of the target data quantity and the target data quality for each encoded data block, and an encoder operable to encode each of the data blocks in accordance with the encoding process to form encoded data blocks using the value of the encoding parameter determined for each block, and a selection processor operable, for each data block, to select one of the encoded blocks produced by each of the plurality of encoding processors in dependence upon which of the data blocks has at least one of the highest quality and the lowest data quantity. The encoding process is selected to provide either the highest decoded image quality or the lowest encoded data quantity depending on whether the compression ratio for each data block is fixed or the decoded data quality is fixed and the quantity of encoded data arranged to vary. Embodiments of the present invention find particular application for encoding video data, and for use in the Motion Picture Experts Group-IV (MPEG-IV) coding scheme.

41 Claims, 7 Drawing Sheets

DATA ENCODING APPARATUS AND METHOD

This is a continuation of copending International Application PCT/GB01/03032 having an international filing date of 6 Jul. 2001.

FIELD OF INVENTION

The present invention relates to data encoding apparatus and methods of encoding data. In preferred embodiments the data encoded is video data, so that the present invention also relates to video data processing apparatus and methods of processing video data.

Embodiments of the present invention can also provide a recording/reproducing apparatus, a communications processor for communicating video data and an encoded video data format.

BACKGROUND OF INVENTION

Data is often encoded into a different form to facilitate for example communication, storage or identification. An example of encoding data is to reduce a quantity of data to be communicated or stored in some way. Such encoding is also known by the term compression or compression encoding. Whilst compression encoding is applicable to all types of data, data compression finds particular application with video data, because typically video data which represents images requires a relatively large quantity of data in order to represent the images.

Known encoding techniques for video data use the Discrete Fourier Transform or the Discrete Cosine Transform (DCT) to convert the image data from the spatial domain to a transform domain in which the image pixel values are de-correlated. The de-correlated transform domain data may then be more efficiently compression encoded. Moreover, in the transform domain, the DCT coefficients which represent the DCT encoded image can be quantised, thereby reducing an amount of data required to represent the image. Furthermore, when the image is Inverse Discrete Cosine Transform decoded, a reduction in the image quality as the decoded image appears to the human eye is usually so small as to be not noticeable, particularly if the higher frequency components are quantised to a greater extent than the lower frequency components. For example, the DCT transform is used in the Joint Photographic Experts Group (JPEG) and the Motion Picture Experts Group (MPEG) II compression encoding standards.

Although the DCT transform has been widely adopted, in particular for compression encoding, the DCT transform suffers a disadvantage because typically a length of binary data words which are used to represent the DCT coefficients is greater than the length of the data in the spatial domain. As a result, a significant amount of quantisation must be performed, discarding information, from the encoded image, before a compression gain is effected. Furthermore at high compression ratios (encoded data compared to un-coded data quantity), a significant loss of image quantity is caused, when the quantised DCT encoded image is inverse quantised and IDCT decoded.

SUMMARY OF INVENTION

According to the present invention there is provided a data encoding apparatus operable to encode a plurality of data blocks to produce encoded data in accordance with at least one of a selectable target data quantity and a selectable target data quality, the apparatus comprising a plurality of encoding processors each having a first parameter controller operable to determine, for each of the data blocks, a value for an encoding parameter to be used in an encoding process, which encoding parameter has an effect of influencing the quantity of encoded data produced by the encoding process and the quality of a decoded version of each data block encoded using the encoding process, the value of the parameter being determined to satisfy at least one of the target data quantity and the target data quality for each encoded data block, and an encoder operable to encode each of the data blocks in accordance with the encoding process to form encoded data blocks using the value of the encoding parameter determined for each data block, and a selection processor operable, for each data block, to select one of the encoded blocks produced by each of the plurality of encoding processors in dependence upon which of the encoded blocks provides at least one of the highest quality and the lowest data quantity.

It has been discovered that whilst one encoding process may provide a better quality decoded image at a certain data compression ratio than a second encoding process, at another compression ratio, the second encoding process may provide a better decoded image quality. More particularly, but not exclusively, for the example of image coding, the quantity of encoded data produced by each encoding process will differ in dependence upon the content of the part of the image being encoded. The present invention recognises that no one encoding process provides optimal encoding to meet a variety of quality and quantity targets. As such one of a plurality of encoding processes may be optimal for a given compression ratio or quality target and for a given coded data block. Therefore, if a constant data rate is required from the encoding apparatus, then an encoding parameter is determined for each of the plurality of encoding process to satisfy the target data quantity in a first stage. In a second stage, one of the encoded blocks from one of the plurality of the encoding processes is selected which provides the highest quality. However the encoding apparatus according to the present invention may also be arranged to accommodate variable data rates. In the case of variable data rates, the quality of the encoded data is fixed, so that in the first stage the encoding parameter for each of the plurality of encoding processes is determined to satisfy the target data quality, and in the second stage the encoded block is chosen from one of the encoding processes which produces the lowest data quantity. Alternatively a particular target quality and target quantity may be set and encoding and selection performed to satisfy both requirements.

In one embodiment, the encoding apparatus may be operable to encode the plurality of data blocks to produce a substantially constant selectable encoded data quantity, the target data quantity being selected to satisfy the constant encoded data quantity, each of the encoding processors determining the encoding parameter to satisfy the target data quantity, and the selection processor may be operable to select one of the encoded blocks with the highest quality of a decoded version of the data block represented by the encoded block. For this example embodiment therefore, a selected compression ratio is provided which provides a selected encoded data quantity. The data encoding apparatus determines for each of the encoding processors an encoding parameter which will satisfy the selected encoded data quantity for each of the encoding processes, and then determines the image quality that results by decoding the encoded image, and selects the encoding process for that data block with the highest quality. For this embodiment therefore the present invention selects an optimal coding process from a plurality of encoding processes in accordance with a target selected encoded data quantity and the resulting quality of the decoded data block.

In another embodiment the encoding apparatus may be operable to encode the plurality of data blocks to produce a substantially constant selectable data quality, the target data quality being selected to satisfy the constant data quality, each of the encoding processors determining the encoding parameter to satisfy the target data quality, and the selection processor may be operable to select one of the encoded blocks with the lowest data quantity. For this embodiment the data quantity produced by the encoding apparatus is allowed to vary, and encoding is performed to satisfy a fixed quality of decoded data. A selection is made of the encoded block which provides the lowest encoded data quantity.

In preferred embodiments, each of the encoded blocks produced by the respective encoders may be formed from coded data symbols having a minimum and a maximum value, and each of the encoding parameters may be a level of quanitising used to produce the respective coded symbols. The quantisation performed in the encoding processes therefore controls the resulting quantity of encoded data produced. Since the encoding processes are different, a level of quantisation that may be required to meet the target selected data quantity for each encoded block may be different for each of the encoding processes. For loss-less encoding, the quantisation level would be set at zero, so that the data would be represented as the full pre-determined length of the words. Although the coded symbols may be symbols according to any number base, in preferred embodiments the coded symbols may be for example binary words, the level of quantisation being a number of least significant bits of the binary words which are ignored or rounded.

Advantageously, in order to further improve the compression efficiency, the data encoding apparatus may comprise an entropy encoder operable to receive in accordance with the selection made by the selection processor the selected encoded blocks, the entropy encoder being operable to represent the coded symbols as entropy coded symbols, wherein the parameter controller for each encoding processor may be operable to determine the encoding parameter consequent upon the quantity of entropy coded data produced when entropy encoding the encoded blocks. The parameter controllers therefore operate in a feed forward manner to determine the amount of encoded data which will result after the data has been encoded with the encoding processes and then encoded by the entropy encoder to provide the encoded data to be output, if selected from the encoding apparatus.

As already explained the data encoding apparatus finds application for encoding any type of data to meet a selected target encoded data quantity or target data quality or both. However the data encoding apparatus provides a particular advantage when encoding video data, wherein each of the data blocks is representative of a part or the whole of a video picture, the encoding apparatus forming a compression encoder adapted to apply one of the encoding processes in accordance with the selectable data quantity and the quality metric for each encoded data block.

In preferred embodiments, a first of the encoding processes may be the Discrete Cosine Transform (DCT), the coded symbols being DCT coefficients, the value of the encoding parameter providing a level of quantisation of the DCT coefficients, and the selection processor may be operable to decode the first encoded blocks by inverse quantising and Inverse Discrete Cosine Transforming the quantised DCT coefficients of the encoded block. It has been discovered that for high compression ratios the DCT transform generally provides a higher decoded image quality than other encoding processes, and furthermore provides a facility for producing MPEG-II compatible encoded data. However for lower compression ratios the Differential Pulse Code Modulation prediction process provides a higher decoded image quality than the DCT transform. Accordingly in preferred embodiments, a second of the plurality of encoding processors may be operable in accordance with the Differential Pulse Code Modulation (DPCM) prediction process, the value of the encoding parameter providing a level of quantisation of data symbols before or after performing the DPCM prediction process to produce the second encoded blocks, and the selection processor may be operable to decode the second encoded blocks by reverse DPCM processing the second encoded block and inverse quantising the reverse DPCM processed symbols or the DPCM processed symbols to form the recovered versions of the data block from the second encoded data block.

The Differential Pulse Code Modulation (DPCM) prediction encoding/decoding process as referred to herein is the prediction process as described for example in co-pending UK patent application serial No. 0014890.8, and all variations of DPCM, such as for example VW-DPCM also described in this co-pending UK patent application.

It has been discovered that another encoding technique known as the Integer Wavelet Transform (IWT) provides a higher decoded image quality than the DCT transform or the DPCM prediction process at generally very high compression ratios. As such, one of the plurality of encoding processors may be operable to encode the data blocks in accordance with the IWT.

Aspects of the present invention also include a method of encoding a plurality of data blocks, a video processing apparatus, a recording and/or reproducing apparatus, a recording medium, a communications processor, a communications receiver and a signal, as defined in the appended claims.

Various further aspects and features of the present invention are defined in the appended claims. Combinations of features from the dependent claims may be combined with features of the independent claims as appropriate and not merely as explicitly set out in the claims.

BRIEF DESCRIPTION OF THE DRAWINGS

Example embodiments of the present invention will now be described, by way of example only, with reference to the accompanying drawings in which like reference signs relate to like elements and in which:

FIG. 2b is a representation of discrete values of the relationship plotted in FIG. 2a;

DESCRIPTION OF THE PREFERRED EMBODIMENTS

As explained above embodiments of the present invention can be used to encode any type of data to provide an amount of data compression. However an example embodiment of the present invention will be described with reference to compression encoding video data. Moreover, the present invention finds particular application as an encoding process with, for example, the MPEG 4 compression encoding standard.

Embodiments of the present invention utilise a characteristic of different compression encoding processes which is that a quality of the decoded image in terms of signal to noise ratio varies between different encoding processes for different compression ratios. This is illustrated in FIG. 1.

Figure 1:
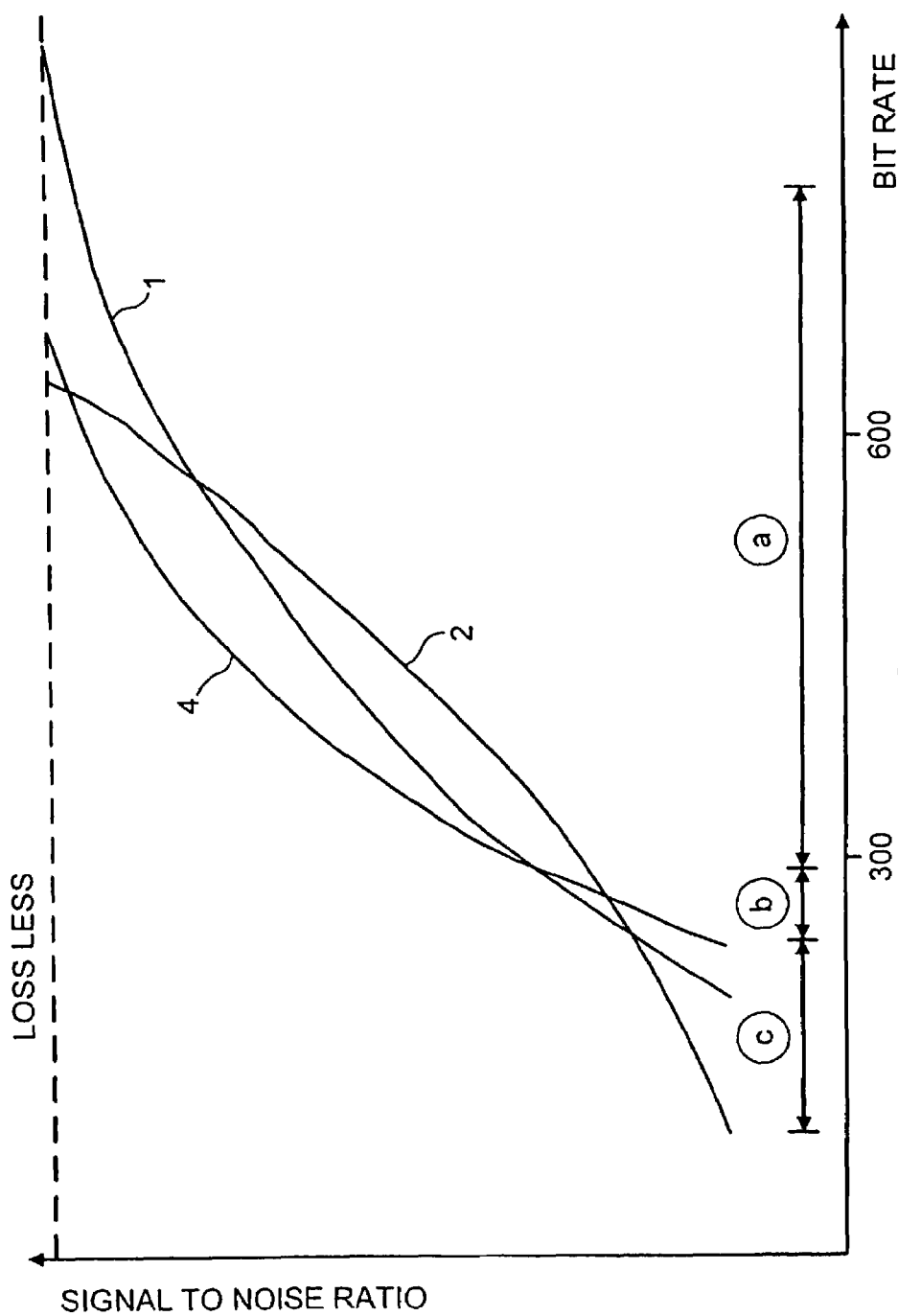
FIG. 1 is a graphical illustration plotting an example of a relationship between signal to noise ratio and bit rate for three encoding processes.

In FIG. 1 three curves are shown which represent a relationship between signal to noise ratio and bit rates produced when comparing an original data block and an encoded and decoded data block for three compression encoding processes which are DCT transform encoding, IWT transform encoding and DPCM prediction encoding. The target bit rate is produced by compression encoding the data using the three encoding processes by adjusting a value of an encoding parameter such as, for example, a level of quantisation. For each of the three curves shown in FIG. 1 the quality of the decoded image is determined from the signal to noise ratio of an image data block from a comparison between the version of the data block recovered by decoding the encoded block and reversing the quantisation, and the original data block. However it will be appreciated that this is one example of a quality metric. Other examples of quality metrics include an absolute error count, or the mean squared error.

It should be emphasised that the relationship of signal to noise ratio with respect to bit rate for the three compression encoding schemes, shown in FIG. 1, is illustrative of a general tendency. This is because the signal to noise ratio at any particular bit rate (produced for a degree of data compression) will depend on the content of the data block being encoded. The first curve 1 shown in FIG. 1 provides an illustration of the relationship of signal to noise ratio against bit rate for a DCT encoded data. The second curve 2 illustrates the relationship between signal noise ratio and bit rate for IWT encoded data and the third curve 4 illustrates a relationship for DPCM predictive encoded data. For each of the three curves, the bit rate is reduced by adjusting a parameter of the respective encoding processes. In the example embodiments described the encoding parameter is an amount of quantization applied to data during the encoding process, although it will be appreciated that other parameters could be used to vary the bit rate.

As illustrated in FIG. 1 for medium to low compression ratios resulting in the bit rates falling within a first range (a), DCPM predictive encoding provides a higher signal to noise ratio than both DCT and IWT encoding. However in a second region (b) DCT transform encoding provides a higher signal to noise ratio whereas in a third region (c) IWT transform encoding provides the highest signal to noise ratio.

As illustrated in FIG. 1 the best choice of encoding process varies in dependence upon the compression ratio which determines the quantity of data to be produced by the encoding process. Embodiments of the present invention seek to utilise this characteristic by selecting the optimum encoding process in dependence upon the encoded data quantity selected and the quality of the decoded image which results from applying each of the encoding processes. The encoding process is selected in dependence upon the quality of the decoded image on a block by block basis rather than simply selecting the encoding process on the basis of the target bit rate because as already indicated the quality of the encoded image provided by each of the three encoding processes varies in dependence upon the content of the image block being encoded and decoded. Correspondingly, as will be explained, in other embodiments, the quality of the encoded image may be fixed and the bit rate allowed to vary, the encoding process being selected which provides the lowest bit rate. Generally the optimum encoding process to be selected on the basis of quality for the example illustration of the general tendency shown in FIG. 1, can be summaried as shown in the table below:

| Priority | Lower Quality | High Quality |
|----------|---------------|--------------|
| 1 | DCT | DPCM |
| 2 | DCT | IWT |
| 3 | IWT | DPCM |

Figure 2A:
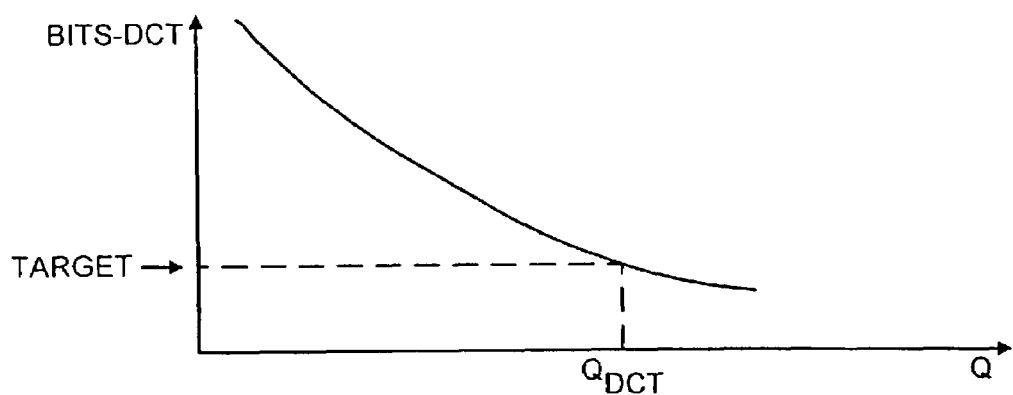
FIG. 2a is a graphical illustration plotting an example relationship between a level of quantisation and a number of bits produced for an encoded data block using one of the encoding processes shown in FIG. 1.

In order to meet the selected data quantity determined from the desired compression ratio, embodiments of the present invention must also determine an encoding parameter used in each of the encoding processors which has an effect of changing the amount of encoded data produced by the encoding process. As mentioned above, the example embodiments which will now be described, the encoding parameter used to influence the amount of encoded data produced for any particular data block is a level of quantization applied to data forming part of the encoding process. Again the amount of quantization which must be applied in order to satisfy a target data quantity will vary in dependence upon the content of the image block. This is illustrated in FIG. 2a for an example encoding scheme, which may be for example the DCT transform encoding. It will be appreciated however that in other embodiments the level of quantisation may be set to zero, therefore providing loss less encoding. In this case, the encoding process is selected on the basis of the data quantity generated.

In the following description it will be assumed that encoding is performed on the basis of data blocks comprising a plurality of macro blocks, a macro block being a block containing 16×16 pixels. The macro block unit could comprise one macro block or could comprise an entire picture and the macro block unit will vary for a particular application.

Figure 2B:
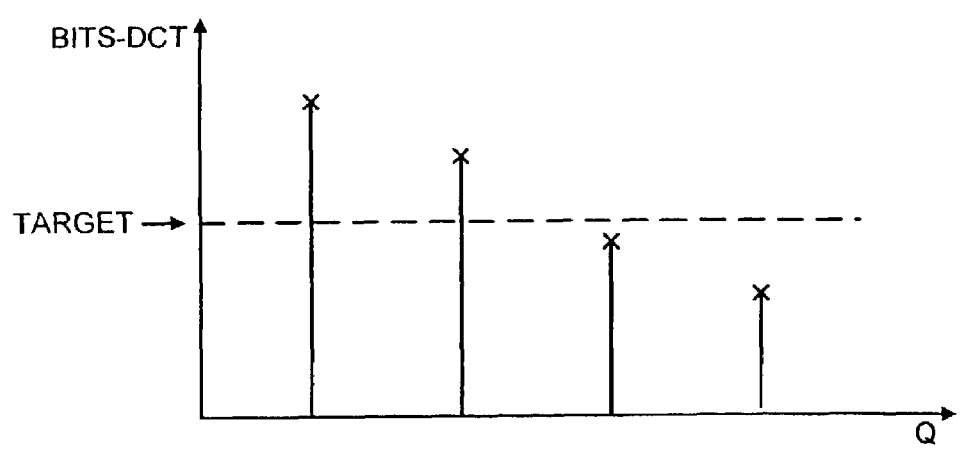

In FIG. 2a a graph is shown illustrating a relationship of a number of bits produced when encoding a data block using the DCT transform encoding with respect to a quantization level for the DCT coefficients. The DCT encoding process will be explained shortly, however the relationship shown in FIG. 2a illustrates that for each block there is a relationship between number of bits produced by the DCT encoding with respect to the quantization level used. Therefore it can be appreciated that given a target bit size determined from a compression ratio to be used which sets a data quantity of the encoded data, a quantization level can be determined for each data block for the particular encoding process used. As will be explained shortly FIG. 2b provides a more practical determination of the quantization step size, by determining a bit amount for four example discrete quantization levels. For the example in which the quantity of encoded data is constant, the quantization level selected for the encoding process is set at the smallest level of quantization which will satisfy the selected quantity of data to be allowed in order to meet a given compression ratio.

It will be appreciated therefore from the foregoing discussion that for constant bit rate encoding, an optimum scheme for encoding video data blocks is to first determine for each encoding process the quantization level which would satisfy the selected bit quantity and then to compare the relative quality of the recovered version of the data block with respect to the original data block and to select the encoding scheme providing the best quality. It is this example which will be used to illustrate an example embodiment of the invention, although it will be appreciated that in other embodiments the data quality of encoded/decoded data may be fixed, and the encoding process selected which provides the lowest data quantity.

Figure 3:
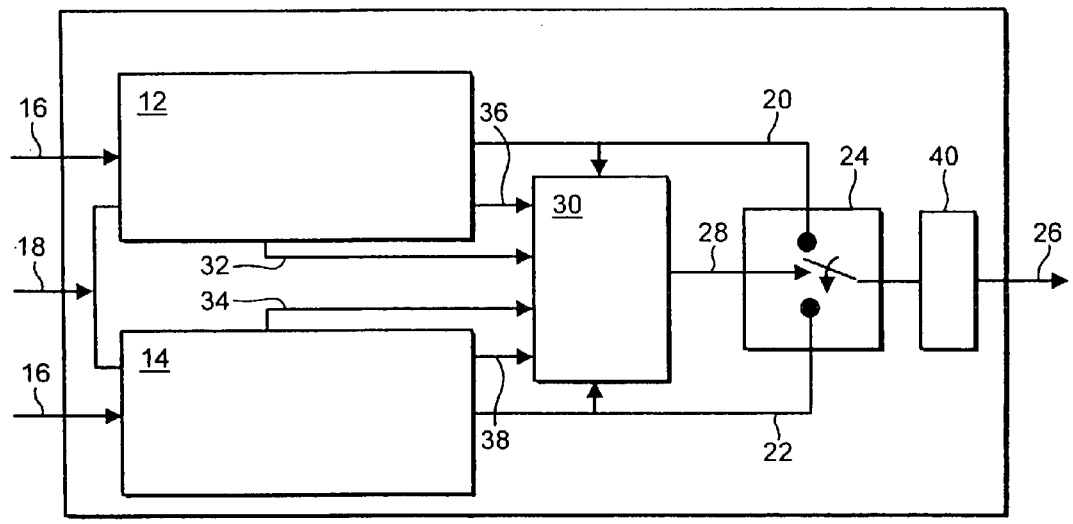
FIG. 3 is a schematic block diagram of an encoding apparatus according to an example embodiment of the present invention.

An encoding processor which utilises the characteristic of different encoding processors, according to a first embodiment of the present invention is shown in FIG. 3. In FIG. 3 a data encoding processor 10 is shown to comprise first and second data encoders 12, 14 each of which is arranged to receive video data from a connecting channel 16. As already explained the video data is formed into macro block units each of which comprises integer number of macro blocks to the effect of dividing a picture of the video data by an equal amount. The first and second encoders 12, 14 are also arranged to receive a control signal via a control channel 18 which indicates a selected data quantity for compression encoding and which sets a target bit amount for the encoded data block. The first and second encoders 12, 14 generate the first and second encoded blocks respectively which are communicated via connecting channels 20, 22 into a controllable switch 24 which is arranged to select one of the first or the second encoded blocks, which are fed to an entropy encoder 40 in dependence upon a control signal received from a switch control channel 28 from a selection processor 30. The entropy encoder performs and entropy encoding scheme such as Huffman encoding or VLC encoding and then outputs the entropy encoded selected block on an output channel 26. The selection processors 30 also receives the first and second encoded blocks from the connecting channels 20, 22 and receive a copy of the original data block from connecting channels 32, 34 from each of the first and second encoders respectively. The selection processor 30 also receives the value of the quantization used by the first and second encoders 12, 14 via connecting channels 36, 38.

For the example of encoding video data, it will be appreciated that in accordance with conventional formats the video data has typically three components which correspond to the red, green or blue components of a colour image or the YUV luminance and two colour difference components. The following explanation will consider only a single component, although it will be appreciated that the explanation presented for encoding a single component being one of the YUV or RGB components can be equally applied to the other components.

Figure 4:
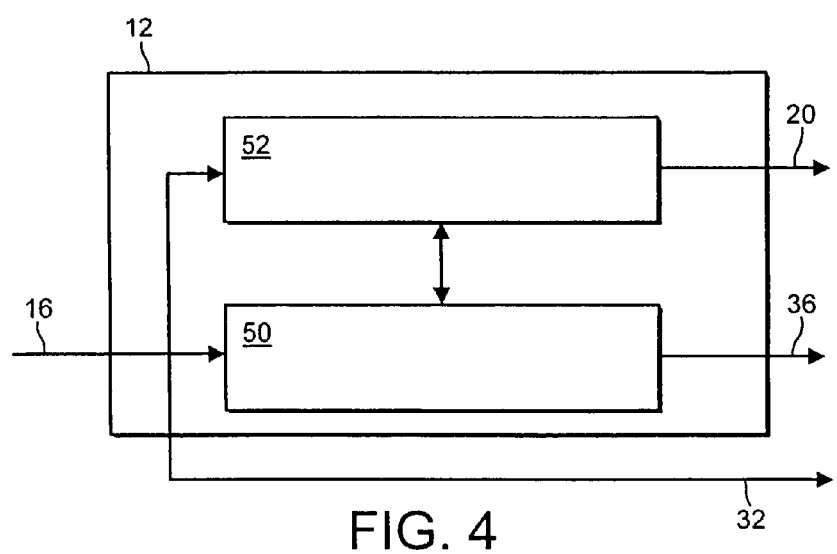
FIG. 4 is a schematic block diagram illustrating a general example arrangement of one of the encoding processors shown in FIG. 3.

A general architecture for the first encoding processors 12 is shown in FIG. 4 where parts also appearing in FIG. 3 have the same numerical references. In FIG. 4 the first encoding processor 12 is shown generally to have a parameter controller 50 and an encoder 52. As shown in FIG. 4 the macro block units of the video data are received from the connecting channel 16 by the encoder 52 and the parameter controller 50. Each data block is then output on the connecting channel 32 to the selection processor 30. The parameter controller 50 is arranged to determine the quantization level to be used for encoding the data block using the first encoding process which is performed by the encoder 52. The first encoded data block is then presented at connection channel 20 which is fed to the selection processor 30 and the control switch 24. The parameter controller 50 provides at the connecting channel 36 the quantization level used by the first encoder 52.

As shown in FIG. 3 the encoding apparatus 10 also includes the entropy encoder 40 which is arranged to entropy encode either the first or the second encoded blocks received from the control switch 24. Therefore the parameter controller 50 is operable to determine the quantization level to meet the overall encoded data quantity as produced from the entropy encoded data block at the output channel 26. The encoding processor shown in FIG. 4 therefore forms the first feed forward pass of the encoding process performed by the encoding apparatus 10 shown in FIG. 3. The second pass, in which one of the first or second blocks is selected to represent the original data block is performed by the selection processor 30 which is shown in more detail in FIG. 5, in which parts also appearing in FIGS. 3 and 4 have the same numerical references.

Figure 5:
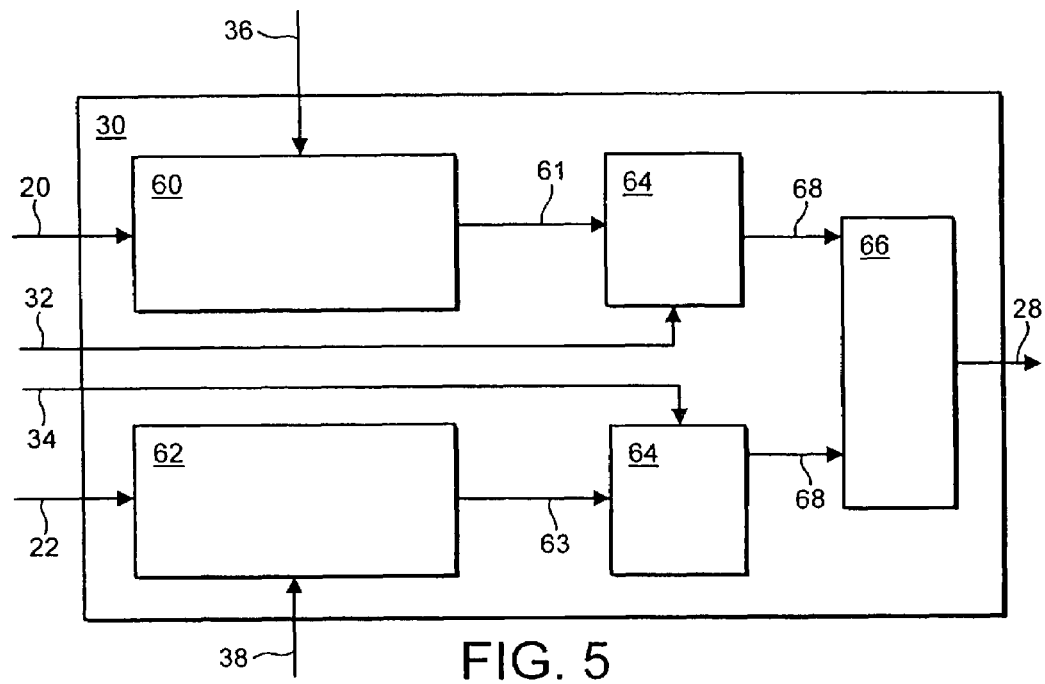
FIG. 5 is a schematic block diagram illustrating in more detail a selection processor which appears in FIG. 3.

In FIG. 5 the selection processor 30 is arranged to receive the first and the second encoded blocks via connecting channels 20, 22 at first and second decoders 60, 62. The first and second decoders 60, 62 also receive the first and second quantization values used to encode the data block in the first and the second encoding processes respectively. The first and second decoders 60, 62 operate to decode the first and second data blocks respectively applying an inverse of the quantization applied in the respective encoding processes. The recovered version of the original data block is then fed to a metric processor 64 which also receives the original data block via the connecting channels 32, 34. The metric processors 64 operate to generate a quality metric such as the signal to noise ratio or the mean square error between the recovered version of the data block and the original data block or an absolute error count between the recovered data block and the original data block. The quality metrics are then received at a comparator 66 from connecting channel 68 and consequent upon the best quality metric either the first or the second encoded block is selected by generating a control signal from the comparator 66 which is applied to the control signal channel 28.

It will be appreciated from the explanation provided for the general representation of the selection processor 30 shown in FIG. 5, that the quality metric is generated for each of the first and the second encoded blocks from a comparison between a decoded and an inverse quantized version of the data block and the original data block. On this basis either the first or the second blocks are selected so that the best of the encoding processes is chosen in accordance with the characteristics shown in FIG. 1. However in alternative embodiments, the quality metric may be predicted from the quantisation level and for the particular encoding process.

As will be appreciated although the first and second encoding processes could be any suitable encoding process, in preferred embodiments the first encoding process is the DCT transform process and the second encoding process is the DPCM prediction process. Therefore, in accordance with preferred embodiments, the first encoding processor 12 would be as illustrated in FIG. 6 where parts also appearing in FIGS. 3 and 4 have the same numerical references.

Figure 6:
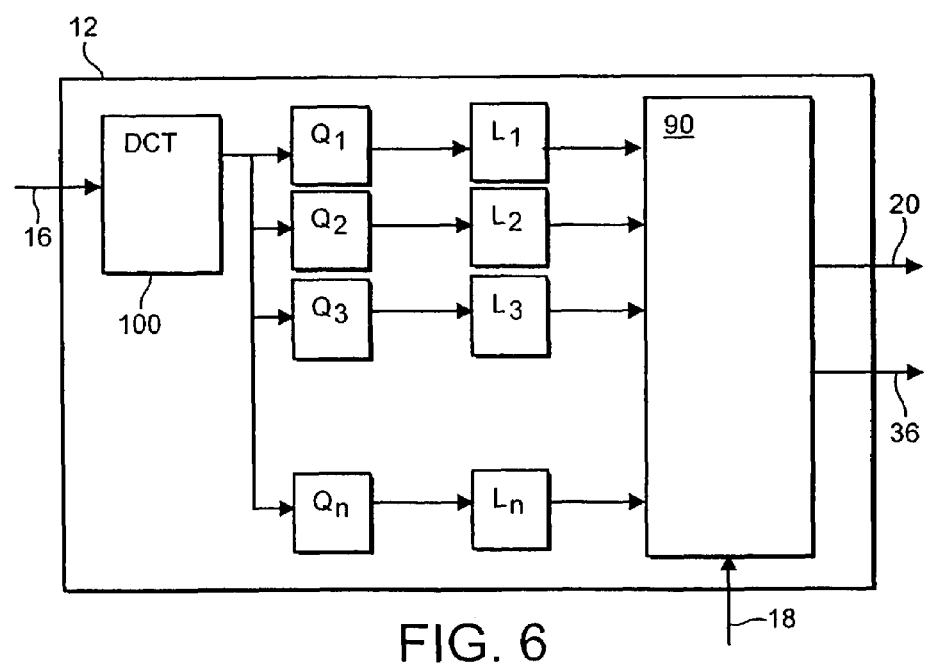
FIG. 6 is a block diagram of an example encoding process for DCT encoding.

As shown in FIG. 6 the data block is first received from the connecting channel 16 by a DCT transform processor 100. The DCT transformed data block is then fed to each of a plurality of quantization processors Q1, Q2, Q3, . . . QN. Each of the quantization processors is arranged to quantize the DCT coefficients of the transformed data block in accordance with one of the quantization amounts as illustrated, for example, by the discrete representations shown in FIG. 2b. The quantized transformed data blocks are then received by one of a corresponding plurality of length processors L1, L2, L3, . . . LN which determine a relative data amount which will be produced if the quantized and transformed data block were to be entropy encoded by the entropy encoder 40. A bit allocator 90 is then arranged to select the version of the quantized and transform encoded data block for a minimum quantization level which still satisfies the selected bit amount as determined from the control signal from the control channel 18. The bit allocator 90 then presents at the connecting channel 20 the quantized and transform encoded data block corresponding to the selected quantization level and at the connecting channel 36 data indicating the quantization level selected by the bit allocator 90. Therefore, generally the DCT transform 100, quantization processors, and the length processors form the encoder 52 shown in FIG. 4 whereas the bit allocator 90 forms the parameter controller 50 in combination with the length processors.

Figure 7:
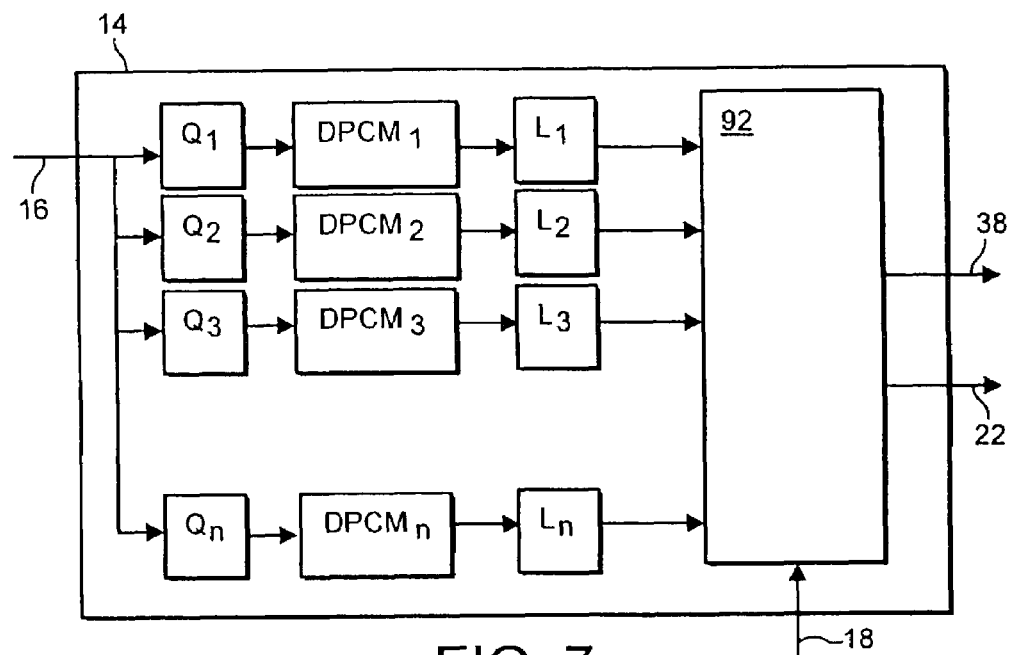
FIG. 7 is a block diagram of an example encoding process for DPCM prediction encoding.

The second encoding process applied by the second encoding processor 14 is the DPCM prediction process. An example implementation of the second encoding processor 14 is shown in FIG. 7 where parts also appearing in FIGS. 3 and 4 have the same numerical references. The second encoding processor shown in FIG. 7 corresponds substantially to the first encoding processor shown in FIG. 6, so only the differences will be explained. The second encoding processor shown in FIG. 7 has a plurality of quantization processors which first apply the different levels of quantization to the pixels of the data block in the pixel domain. Each of the differently quantized data blocks is then predictive encoded in accordance with the DPCM prediction process and a prediction encoded version of the data block is produced for each of the different quantization levels. Length processors L1, L2, L3 . . . LN then determine the quantity of data which will result when each of the prediction encoded data blocks is entropy encoded by the entropy encoder 40. A bit allocator 92 then selects the prediction encoded data block which satisfies the selected data quantity for a minimum quantization level and presents the corresponding DCPM prediction encoded block as the second encoded block on the connecting channel 22. Correspondingly the quantization level corresponding to the selected block is presented at the connecting channel 38. In an alternative embodiment, the quantisation could be applied after the DPCM prediction encoding.

Figure 8:
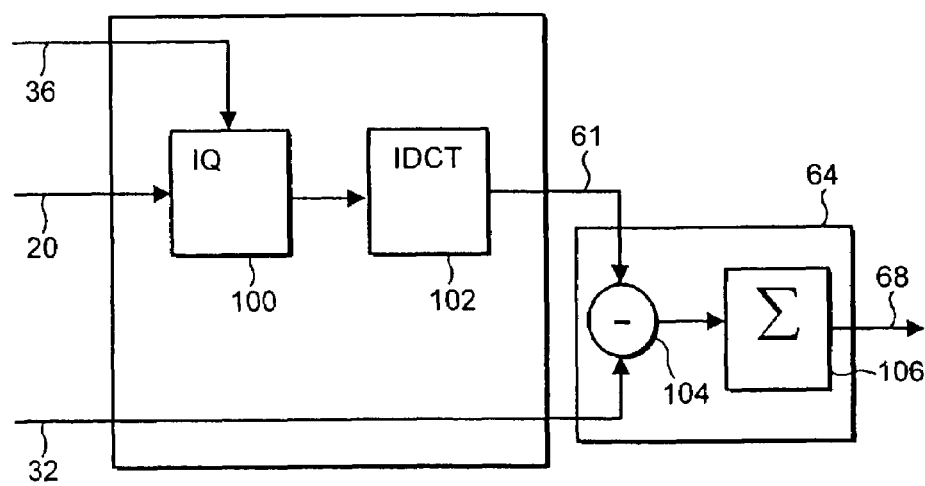
FIG. 8 is a schematic block diagram of a decoder for DCT encoded data.
Figure 9:
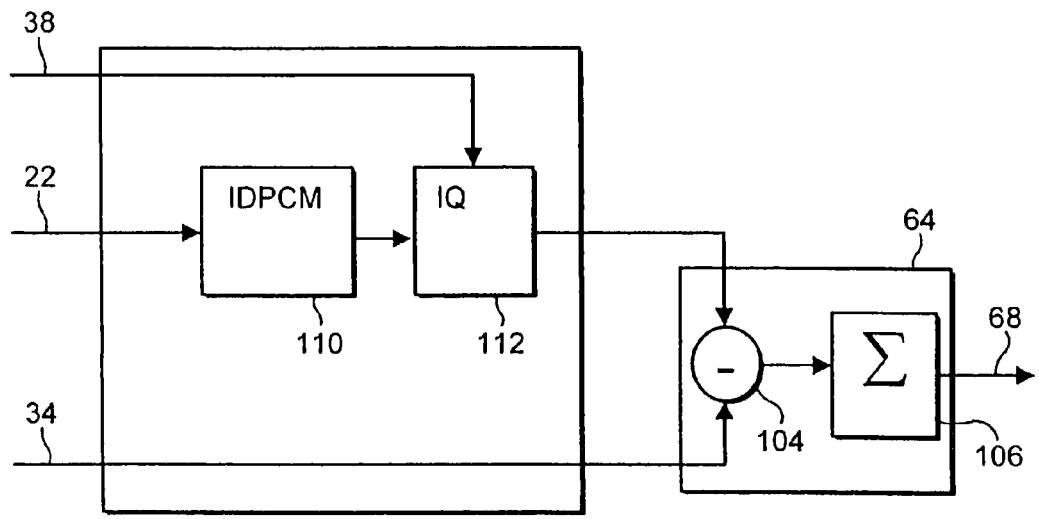
FIG. 9 is a schematic block diagram of a decoder for DPCM prediction encoded data.

For the example embodiment in which the first encoding process is the DCT transform and the second encoding process is the DPCM prediction process, an example of the first and the second decoders 60, 62 which are shown in FIG. 5 are presented in FIGS. 8 and 9 where parts also appearing in FIG. 5 have the same numerical references. In FIG. 8 the first decoder 60 receives the quantized DCT transformed data block from the connecting channel 20 at an inverse quantizer 100 which inverse quantizes the transform coefficients in accordance with the level of quantization determined for the first encoded block. An IDCT transform is then provided by an IDCT transformer 102 and the recovered version of the data block fed via the connecting channel 61 to bit-wise comparator 104 within the metric processor 64. At a second input of the bit-wise comparator 104, the original data block is received through the connecting channel 32 and the number of differences in the bits of the pixels of the comparison added by an adder 106 to generate the quality metric at the output channel 68. Correspondingly, the second decoder shown in FIG. 9 comprises similar parts except that the inverse DCPM prediction is performed first by an IDPCM processor 110 before the inverse quantization is applied to the IDPCM decoded data by an inverse quantizer 112. The quality metric is formed by the metric processor 64 in corresponding way.

The encoding apparatus described above and shown in FIG. 3 can be used in various applications such as for communicating data or storing data, and in particular for video data in applications such as in the MPEG IV standard. For example, a data recording and/or reproducing apparatus is shown as a somewhat simplified block diagram in FIG. 10a. The data recording and/or reproducing apparatus 140 comprises the data encoding apparatus 10 and a data formatter 142. The data formatter 142 operates to form the encoded data blocks into a data format including a header for each block having first and second fields. Data format is shown in FIG. 10b.

Figure 10A:
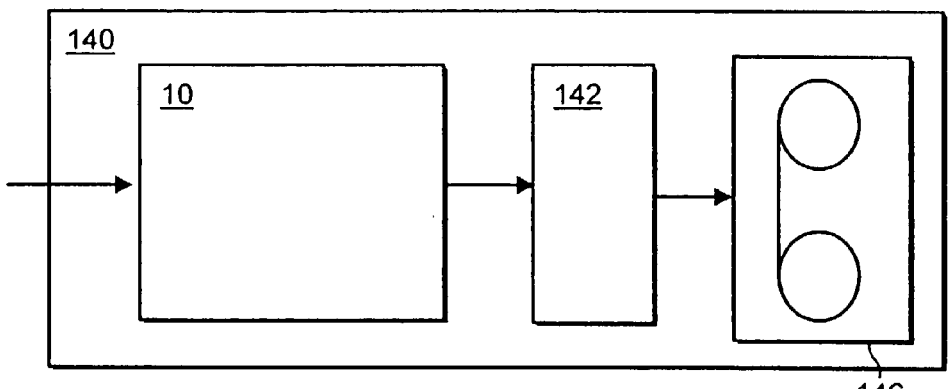
FIG. 10a is a schematic block diagram of a data recording/reproducing apparatus.
Figure 10B:
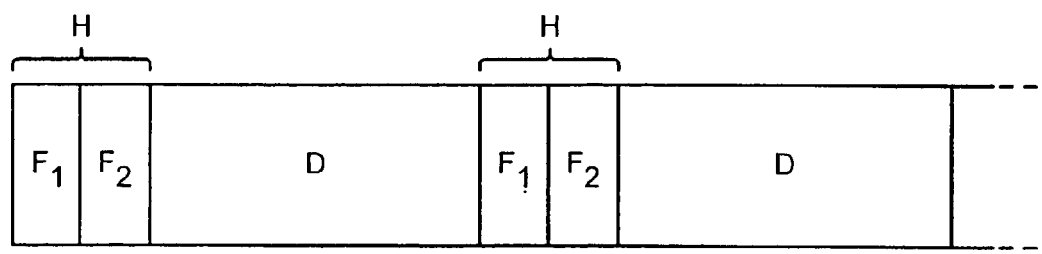
FIG. 10b is a schematic diagram of a data format, produced for example by the data recording/reproducing apparatus of FIG. 10b.

In FIG. 10b the encoded data blocks are arranged in data fields D. Each of the data fields D has a header H comprising a first field F1 and a second field F2. The first field F1 is provided with data indicating whether the first or the second coding process was used to encode the data block held in the data field D. The second field F2 contains data representative of the encoding parameter (quantization level) used to encode the encoded data block in the first or the second encoding process. The formatted data may then be recorded onto an appropriate storage medium such as magnetic tape or the like which as shown in FIG. 10a is performed by a tape drive 146. However it will be appreciated that this data format can be used for not only storing the data but for communicating the data, and for remotely decoding the encoded data. Accordingly, a data decoding apparatus which is arranged to decode data in the format shown in 10b is shown in FIG. 11.

Figure 11:
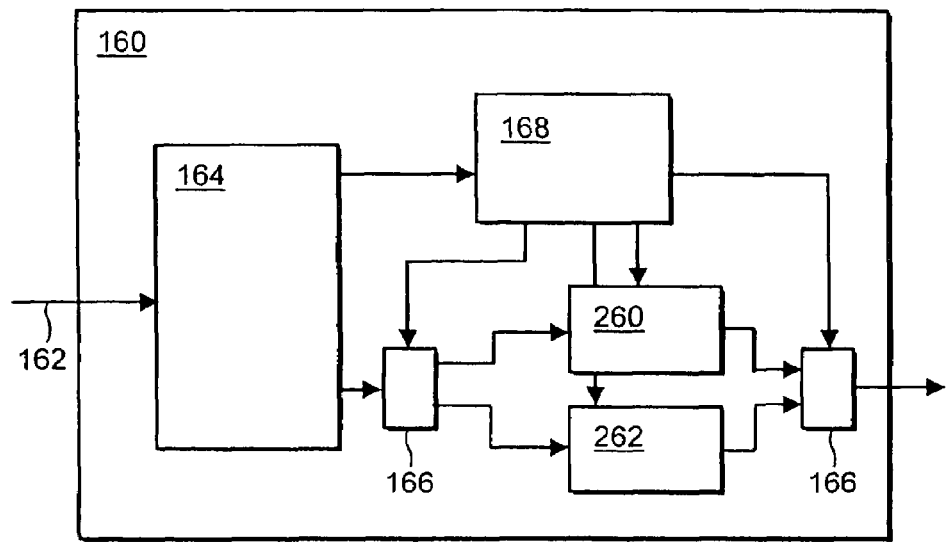
FIG. 11 is a schematic block diagram of a data decoding apparatus.

In FIG. 11 a data decoding apparatus 160 receives the formatted encoded data from a connecting channel 162 at a data deformatter 164. The data deformatter 164 separates the header information from the encoded data blocks and feeds the data blocks to a controllable switch 166. A control processor 168 receives the information contained in the first and second fields F1, F2 and feeds the encoded data blocks to first and second encoders 260, 262 in dependence upon a control signal applied to the controllable switch 166. As will be appreciated, the first and second decoders 260, 262 can be formed substantially in accordance with the first and second decoders 60, 62 shown in FIGS. 8 and 9. Thus, in accordance with the value of the field F1, the first or the second decoder 260, 262 is applied to the encoded data block from the field D, and the quantizing level presented in the second data field F2 is used by the first or the second decoders 260, 262 to recover the data blocks.

In another embodiment of the invention, no quantisation may be applied during encoding so that the compression encoding is loss-less. For this embodiment the encoding process is selected on the basis of which of the encoding processes produces the lowest encoded data quantity, or selected in accordance with some other parameter. For this embodiment the data format would not require the second field F2, so that the data format according to this embodiment would contain only one field indicating for each block which encoding process was used to encode the block. In other embodiments the field or fields may not be arranged in a header but distributed with the encoded data in some way.

Figure 12:
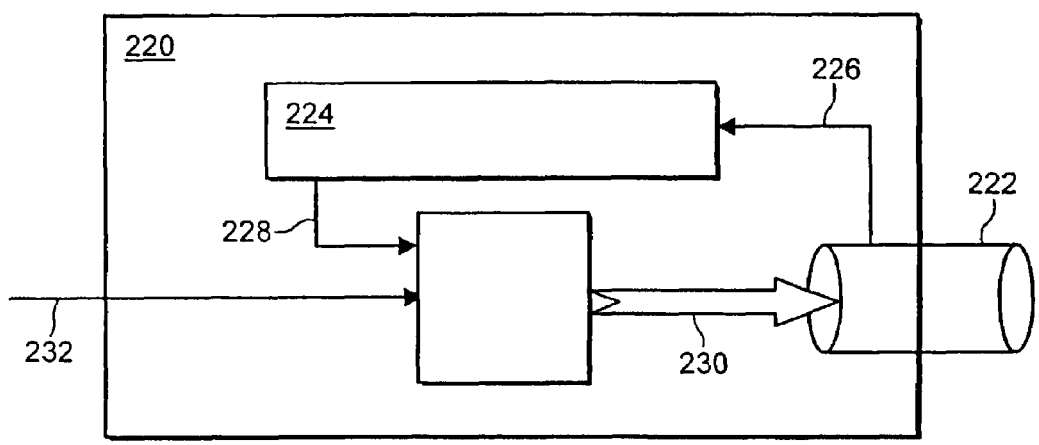
FIG. 12 is a schematic block diagram of a communications processor.

A further application of the encoding apparatus shown in FIG. 3 is shown in FIG. 12 which illustrates a communications processor 220 which is arranged to communicate video data via a communications channel 222 having an dynamically changing but limited band width. A signal representative of the available band width on the communications channel 222 is fed to a controller 224 via a connecting channel 226. The controller 224 generates a control signal fed to the encoding apparatus 10 via a connecting channel 228, which sets the selected data quantity of the encoded data which will be output by the encoding apparatus on feeding channel 230 which feeds the encoded data to the communications channel 222. The video data in macro blocks units are fed from the connecting channel 232 to the encoding apparatus 10 which selects the most appropriate encoding process and encodes the video data in accordance with the target data quantity which meets an allocated band width. If however the band width available from the communications channel 222 can be varied on demand, then the quality of the encoded data may be fixed and the encoding apparatus adapted to selected the lowest encoded data quantity for the fixed data quality.

Various modifications may be made to the embodiments of the present invention herein before described without departing from the scope of the present invention. For example, although the example embodiment has been described with reference to video data, the present invention is not restricted to video data, but may be any type of data including audio data. Accordingly an aspect of the present invention provides an audio processing apparatus for encoding audio data to form a selectable quantity of encoded data, said audio processing apparatus comprising a block former operable to divide said audio data into a plurality of data blocks, a plurality of encoding processors each having a parameter controller operable to determine, for each of said data blocks, a value for an encoding parameter to be used in an encoding process, which encoding parameter has an effect of influencing the quantity of said encoded data produced by said encoding process, said value being determined to satisfy said selectable data quantity for each encoded data block, and an encoder operable to encode each of said data blocks in accordance with said encoding process to form encoded data blocks using the value of said encoding parameter determined for each block, and a selection processor operable, for each data block, to decode the corresponding encoded data block from each encoding processor to form recovered versions of each original data block, and consequent upon the value of a quality metric determined for each of said encoded data blocks from a comparison between the recovered data blocks and said corresponding original data block, to select one of the encoded blocks.

As indicated above, in some embodiments no quantisation may be applied during the encoding process. Therefore, encoding may be performed by at least one of the encoding processors without quantising transform coefficients or at least quantising to a predetermined level.

In other embodiments one or more of the encoding processors may be arranged to use predetermined encoding parameters. These encoding processors may not therefore have a parameter controller, or at least these encoding processors may have a parameter controller, which applies predetermined encoding parameters.

An aspect of the present invention may therefore provide a data encoding apparatus operable to encode a plurality of data blocks to produce encoded data in accordance with at least one of a selectable target data quantity and a selectable target data quality. The data encoding apparatus comprises a first encoding processor having a first parameter controller operable to determine, for each of the data blocks, a value for a first encoding parameter to be used in a first encoding process. The first encoding parameter may have an effect of influencing at least one of the quantity of the encoded data produced by the first encoding process and the quality of a decoded version of each of the data blocks encoded using the first encoding process. The value of the encoding parameter is determined to satisfy at least one of the selectable target data quantity or the target data quality for each encoded data block. The encoding processor includes a first encoder operable to encode each of the data blocks in accordance with the first encoding process to form first encoded data blocks using the value of the first encoding parameter determined for each block. A second encoding processor may be operable to encode each of the data blocks, in accordance with a second encoding process, to form second encoded data blocks. A selection processor may be operable, for each data block, to select one of the encoded blocks produced by each of the plurality of encoding processors in dependence upon which of the encoded data blocks provides at least one of the highest quality and the lowest quality.

In some embodiments the selection processor may be operable, for each data block, to decode the corresponding first and second encoded data blocks to form first and second recovered versions of each original data block, and consequent upon the value of a quality metric determined for each of the first and the second encoded data blocks from a comparison between the first and second recovered data blocks and the corresponding original data block, to select one of the first or the second encoded blocks.

The first encoding process may be the Discrete Cosine Transform (DCT), the first coded symbols being DCT coefficients, the value of the encoding parameter providing a level of quantisation of the DCT coefficients, and the selection processor may be operable to decode the first encoded blocks by inverse quantising and Inverse Cosine Transforming the quantised DCT coefficients of the encoded block.

The second encoding process may be Differential Pulse Code Modulation (DPCM) prediction, the selection processor being operable to decode the second encoded blocks by reverse DPCM processing the second encoded block to recover the data block from the second encoded data block.

The invention claimed is:

1. A data encoding apparatus operable to encode a plurality of data blocks to produce encoded data in accordance with at least one of a selectable target data quantity and a selectable target data quality, said apparatus comprising:

a plurality of encoding processors each having a parameter controller operable to determine, for each of said data blocks, a value for an encoding parameter to be used in an encoding process, which encoding parameter has an effect of influencing the quantity of encoded data produced by said encoding process and the quantity of a decoded version of each said data block encoded using said encoding process, said value of said parameter being determined to satisfy at one of said target data quantity and said target data quality for each encoded data block, and an encoder operable to encode each of said data blocks in accordance with said encoding process to form encoded data blocks using the value of said encoding parameter determined for each block, and a selection processor operable, for each data block, to select one of the encoded blocks produced by each of said plurality of encoding processors in dependence upon which of said encoded data blocks provides at least one of the highest quality and the lowest data quantity, wherein the encoding process performed by one of said plurality of encoding processors is the Discrete Cosine Transform (DCT), said coded symbols produced by said encoding processor being DCT coefficients, the value of the encoding parameter providing a level of quantization of said DCT coefficients or said symbols of said data blocks, and the encoding process performed by another of said plurality of encoding processors is the Differential Pulse Code Modulation (DPCM) prediction process, said another encoding processor comprising, a plurality of quantizing processors, each of which is operable to quantize said data symbols of each data block by a different predetermined amount to form a differently quantized version of said data block, and a plurality of DPCM processors each of which is coupled to one of said plurality of quantizing processors and is operable to prediction encode one of said differently quantized versions of said data blocks received from said one of said quantizing processors to form a different version of said encoded block, wherein a second parameter controller is operable to determine said level of quantization for said encoding parameter by selecting one version of said encoded block produced by one of said plurality of DPCM processors which satisfies said at least one of the selectable target data quantity and the selectable target data quality, said another encoder being operable to output said selected version of said encoded data.

2. A data encoding apparatus as claimed in claim 1, wherein said apparatus is operable to encode said plurality of data blocks to produce a substantially constant selectable encoded data quantity, said target data quantity being selected to satisfy said constant encoded data quantity, each of said encoding processors determining said encoding parameter to satisfy said target data quantity, and said selection processor is operable to select said one of said encoded blocks with the highest quality of a decoded version of the data block represented by the encoded block.

3. A data encoding apparatus as claimed in claim 1, wherein said selection processor is operable, for each data block, to select said one of said encoded data blocks by decoding each encoded block to form a recovered version of each original data block for each of said plurality of encoding processors, and consequent upon the value of a quality metric determined for each of said encoded blocks from a comparison between the recovered data blocks and said corresponding original data block, to select one of said encoded blocks corresponding to the highest quality metric.

4. A data encoding apparatus as claimed in claim 1, wherein said apparatus is operable to encode said plurality of data blocks to produce a substantially constant selectable data quality, said target data quality being selected to satisfy said constant data quality, each of said encoding processors determining said encoding parameter to satisfy said target data quality, and said selection processor is operable to select said one of said encoded blocks with the lowest data quantity.

5. A data encoding apparatus as claimed in claim 4, wherein each of said encoding processors is operable to estimate the quality of the encoded block to meet said target data quality, from a version of said data block represented by said encoded block and the original data block.

6. A data encoding apparatus as claimed in claim 5, wherein the estimate of said data quality is made for each encoded block in accordance with a pre-determined relationship.

7. A data encoding apparatus as claimed in claim 5, wherein the estimate of said data quality is made by each of said encoding processors, by generating a plurality of versions of the encoded block, each for a different value of the encoding parameter, decoding each version of the encoded block to produce a recovered version of the data block, determining a quality metric from a comparison between each recovered version and the original data block, and selecting the encoded data block having a quality metric which satisfies said target data quality.

8. A data encoding apparatus as claimed in claim 7, wherein said one encoding processor is operable to determine said quality metric by decoding said encoded blocks to produce said recovered version of said data block by inverse quantizing and Inverse Discrete Cosine Transforming the quantized DCT coefficients of the encoded block.

9. A data encoding apparatus as claimed in claim 7, wherein the encoding parameter provides a level of quantization of symbols formed before or after performing said DPCM prediction process to produce said encoded blocks and wherein said another encoding processor is operable to determine said quality metric by decoding said encoded blocks to produce said recovered version of said data block by reverse DPCM processing the encoded block, including inverse quantizing to recover said data block from said second encoded data block.

10. A data encoding apparatus as claimed in claim 1, wherein each of said encoded blocks produced by said respective encoders are formed from coded data symbols having a pre-determined word length respectively, and each of said encoding parameters are a level of quantizing used to produce said respective coded symbols.

11. A data encoding apparatus as claimed in claim 10, wherein said coded symbols are binary words having said pre-determined word lengths respectively, said level of quantization being a number of bits of said binary words which are truncated or rounded.

12. A data encoding apparatus as claimed in claim 1, wherein said selection processor comprising an entropy encoder operable to receive in accordance with the selection made by said selection processor said selected encoded blocks, said entropy encoder being operable to represent said coded symbols as entropy coded symbols.

13. A data encoding apparatus as claimed in claim 12, wherein said parameter controllers of the encoding processors are operable to determine said encoding parameters consequent upon the quantity of entropy coded data produced when entropy encoding said encoded blocks.

14. A data encoding apparatus as claimed in claim 12, wherein said selection processor is operable to determine said quantity of encoded data consequent upon the quantity of entropy coded data produced when entropy encoding said encoded blocks.

15. A data encoding apparatus as claimed in claim 1, wherein said data is video data, each of said data blocks being representative of a part or the whole of a video picture, said encoding apparatus forming a compression encoder adapted to apply one of the encoding processes performed by said plurality of encoding processors in accordance with said at least one of said selectable data quantity and said data quality for said each encoded data block.

16. A data encoding apparatus as claimed in claim 1, wherein the encoder of said one encoding processor comprises
   a DCT transform processor operable to perform said DCT transform to generate said DCT coefficients representative of each said data block,
   a plurality of quantizing processors, each of which is operable to quantize said DCT coefficients by a different predetermined amount to form different version of a first encoded block, and
   a plurality of length processors each of which is coupled to one of said quantizing processors and operable to determine the amount of data of one version of said encoded block, wherein a first parameter controller is operable to determine said level of quantization for said encoding parameter by selecting one of said encoded data versions which satisfies said selectable data quantity, said encoder being operable to output said selected version of said first encoded data.

17. A data encoding apparatus as claimed in claim 1, wherein said selection processor is operable to determine said quality metric for encoded blocks from said one encoding processor by decoding said encoded blocks to produce said recovered version of said data block by inverse quantizing Inverse Discrete Cosine Transforming the quantized DCT coefficients of the encoded block.

18. A data encoding apparatus as claimed in claim 1, wherein said selection processor is operable to decode said encoded blocks from said encoding processor by reverse DPCM processing the encoded block, including inverse quantizing to recover said data block from said second encoded data block.

19. A data encoding apparatus as claimed in claim 1, wherein the encoding parameter used by said DPCM prediction processor is a predetermined level of quantization.

20. A data encoding apparatus as claimed in claim 1, wherein the encoding process performed by a third of said plurality of encoding processors is the Integer Wavelet Transform, Sub-band Transform, or Fractal Transforms.

21. A data encoding apparatus as claimed in claim 1, wherein said quality metric is formed for each of said data blocks from a number of errors between the recovered version of a data block and the original data block.

22. A data encoding apparatus as claimed in claim 21, wherein said quality metric is the sum of absolute errors between the recovered version of a data block and the original data block.

23. A data encoding apparatus as claimed in claim 21, wherein said quality metric is a function of the squared error count between the recovered version of a data block and the original data block.

24. A data encoding apparatus as claimed in claim 1, comprising an output processor coupled to said selection processor and operable to form said selected encoded blocks into a data stream having a predetermined data format, said format having for each original data block a data field indicative of which of said encoded blocks from said plurality of encoding processors was selected to represent said original data block.

25. A data encoding apparatus as claimed in claim 24, wherein said data format produced by said output processor includes another data field indicative of the value of said encoding parameter which was used to encode said selected encoded block.

26. A data decoding apparatus operable to decode an encoded data stream having a format produced by the data encoding apparatus claimed in claim 25, said decoding apparatus comprising:
   a data de-formatter operable to recover said encoded blocks from said encoded data stream and to recover said first and said second data fields;
   a plurality of decoders, each of which is operable to decode data encoded in accordance with one of the encoding processes performed by said plurality of encoding processors using the value of said encoding parameter to recover the data block representative of the encoded block; and
   a decoding processor operable, consequent upon whether said first field, which indicates the encoding processor used to encode the encoded block, to feed said encoded block to a corresponding one of said plurality of decoders with the value of said encoding parameter.

27. A data format as produced by the data encoding apparatus claimed in claim 24.

28. A signal representative of the data format as produced by the data encoding apparatus claimed in claim 24.

29. A data encoding apparatus as claimed in claim 1, comprising a further encoding processor that does not include a parameter controller, said further encoding processor being arranged to encode said data blocks in accordance with predetermined encoding parameters.

30. A method of encoding a plurality of data blocks to produce encoded data in accordance with at least one of a selectable target data quantity or a selectable target data quality, said method comprising:
   determining, for each of said data blocks, for each of a plurality of encoding processes a value for an encoding parameter to be used in each encoding process, which encoding parameter has an effect of influencing the quantity of encoded data produced by said encoding process and the quality of a decoded version of each data block encoded using said encoding process, said value of said parameter being determined to satisfy at least one of said target data quantity and said target data quality for each encoded data block;
   encoding each of said data blocks in accordance with each of said encoding processes to form for each encoding process encoded blocks using the value of said encoding parameter determined for each block; and
   selecting one of the encoded blocks produced by each of said plurality of encoding processes in dependence upon which of said data blocks has at least one of the highest quality and the lowest data quantity, wherein the encoding process performed by one of said plurality of encoding processes is the Discrete Cosine Transform (DCT), said coded symbols produced by said encoding processes being DCT coefficients, the value of the encoding parameter providing a level of quantization of said DCT coefficients or said symbols of said data blocks, and the encoding process performed by another of said plurality of encoding processes is the Differential Pulse Code Modulation (DPCM) prediction process, the encoding process performed by the other of said plurality of encoding processes comprising, quantizing the data symbols of each data block by a different predetermined amount to form a differently quantized version of said data block by using a plurality of quantizing processors, prediction encoding each of said differently quantized versions of said data blocks to form differently encoded version of the data block by using a plurality of DPCM processors that are each coupled to one of said plurality of quantizing processors, and determining said level of quantization for said encoding parameter by selecting one of the encoded versions of said data block produced by one of the DPCM processors which satisfies said at least one of the selectable target data quantity and the selectable target data quality.

31. A method of encoding as claimed in claim 30, wherein said method is operable to encode said plurality of data blocks to produce a substantially constant selectable encoded data quantity, said target data quantity being selected to provide said constant data quantity, said method comprising decoding said encoded data blocks to form recovered versions of each original data block, determining for each of said encoded blocks a quality metric from a comparison between the recovered data blocks and said corresponding original data block, and consequent upon the value of said quality metric, selecting one of said encoded blocks.

32. A computer readable medium having a stored computer program providing computer executable instructions, which when loaded on to a data processor causes the data processor to perform the method according to claim 31.

33. A method of encoding as claimed in claim 30, wherein said method is operable to encode said plurality of data blocks to produce a substantially constant selectable data quality, said method comprising determining said encoding parameter to satisfy said target data quality, and selecting said one of said encoded blocks with the lowest data quantity.

34. A method as claimed in claim 30, wherein said determining, for each of said data blocks, for each of a plurality of encoding processes a value for an encoding parameter to be used in each encoding process, includes for at least one of said encoding processes applying predetermined encoding parameters, said encoding each of said data blocks comprising using said predetermined encoding parameters for said encoding process to form said encoded blocks.

35. A video processing apparatus for encoding video data to form a selectable quantity of encoded video data, said video processing apparatus comprising:

a block former operable to divide said video data into a plurality of data blocks, each data block representing a part or the whole of a picture represented by said video data;

a first encoding processor having a first parameter controller operable to determine, for each of said data blocks, a value for a first encoding parameter to be used in a first encoding process, which first encoding parameter has an effect of influencing the quantity of said encoded data produced by said first encoding process, said value being determined to satisfy said selectable data quantity for each encoded data block, and a first encoder operable to encode each of said data blocks in accordance with said first encoding process to form first encoded data blocks using the value of said first encoding parameter determined for each block;

a second encoding processor having a second parameter controller operable to determine, for each of said data blocks, a value for a second encoding parameter to be used in a second encoding process, which second encoding parameter has an effect of influencing the quantity of encoded data produced by said second encoding process, said value being determined to satisfy said selectable data quantity for each encoded data block, and a second encoder operable to encode each of said data blocks in accordance with said second encoding process to form second encoded data blocks using the value of said second encoding parameter determined for each block; and a selection processor operable, for each data block, to decode the corresponding first and second encoded data blocks to form first and second recovered versions of each original data block, and consequent upon the value of a quality metric determined for each of said first and said second encoded data blocks from a comparison between the first and second recovered data blocks and said corresponding original data block, to select one of said first or said second encoded blocks, wherein said first encoding process is the Discrete Cosine Transform (DCT), said first coded symbols being DCT coefficients, the value of the encoding parameter providing a level of quantization of said DCT coefficients, and said selection processor is operable to decode said first encoded blocks by inverse quantizing and Inverse Cosine Transforming the quantized DCT coefficients of the encoded block, and said second encoder is operable to quantize the data symbols of each data block, and to process the quantized data symbols in accordance with the Differential Pulse Code Modulation (DPCM) prediction process, said second encoder comprising, a plurality of quantizing processors, each of which is operable to quantize said data symbols of each data block by a different predetermined amount to form a differently quantized version of said data block, and a plurality of DPCM processors each of which is coupled to one of said plurality of quantizing processors and is operable to prediction encode one of said differently quantized versions of said data blocks received from said one of said quantizing processors to form a different version of said encoded block, wherein said second parameter controller is operable to determine said level of quantization for said encoding parameter by selecting one version of said encoded block produced by one of said plurality of DPCM processors which satisfies said at least one of the selectable target data quantity and the selectable target data quality, said another encoder being operable to output said selected version of said version data.

36. A video processing apparatus as claimed in claim 35, comprising
an output processor coupled to said selection processor and operable to form said selected first or second blocks representative of said video data into a video stream having a predetermined data format, said format having for each original data block a first field indicative of whether said first or said second data block has selected to represent said data block and a second data field indicative of said first or said second encoding parameter.

37. A video processing apparatus as claimed in claim 35, wherein said second encoder is operable to encode said data blocks in accordance predetermined encoding parameters.

38. A computer readable medium having a stored computer program providing computer executable instructions, which when loaded onto a data processor configures the data processor to operate as a data encoding apparatus according to claim 1, or a video processing apparatus according to claim 35.

39. A computer readable medium having a stored computer program product having a computer readable medium recorded thereon information signals representative of the computer program claimed in claim 38.

40. A data encoding apparatus operable to encode a plurality of data blocks to produce encoded data in accordance with at least one of a selectable target data quantity and a selectable target data quality, said apparatus comprising:
a first encoding processor having a first parameter controller operable to determine, for each of said data blocks, a value for a first encoding parameter to be used in a first encoding process, which first encoding parameter has an effect of influencing the quantity of said encoded data produced by said first encoding process and the quality of a decoded version of each of said data blocks encoded using said encoding process, said value being determined to satisfy at least one of said target data quantity for each encoded data block and said target data quality, and a first encoder operable to encode each of said data blocks in accordance with said first encoding process to form first encoded data blocks using the value of said first encoding parameter determined for each block;

a second encoding processor operable to encode each of said data blocks, in accordance with a second encoding process, to form second encoded data blocks; and
a selection processor operable, for each data block, to select one of the encoded blocks produced by each of said plurality of encoding processors in dependence upon which of said encoded data blocks provides at least one of the highest quality and the lowest quantity, wherein
said first encoding process is the Discrete Cosine Transform (DCT), said first coded symbols being DCT coefficients, the value of the encoding parameter providing a level of quantization of said DCT coefficients, and said selection processor is operable to decode said first encoded blocks by inverse quantizing and Inverse Cosine Transforming the quantized DCT coefficients of the encoded block, and
said second encoding process is Differential Pulse Code Modulation (DPCM) prediction, said second encoding process comprising the encoding process performed by the other of said plurality of encoding processes comprising,
quantizing the data symbols of each data block by a different predetermined amount to form a differently quantized version of said data block by using a plurality of quantizing processors,
prediction encoding each of said differently quantized versions of said data blocks to form differently encoded versions of the data block by using a plurality of DPCM processors that are each coupled to one of said plurality of quantizing processors, and
determining said level of quantization for said encoding parameter by selecting one of the encoded versions of said data block which satisfies said at least one of the selectable target data quantity and the selectable target data quality.

41. A data encoding apparatus as claimed in claim 40, wherein said selection processor is operable, for each data block, to decode the corresponding first and second encoded data blocks to form first and second recovered versions of each original data block, and consequent upon the value of a quality metric determined for each of said first and said second encoded data blocks from a comparison between the first and second recovered data blocks and said corresponding original data block, to select one of said first or said second encoded blocks.

* * * * *